US006910990B2

(12) United States Patent
Doering et al.

(10) Patent No.: US 6,910,990 B2
(45) Date of Patent: Jun. 28, 2005

(54) ENGINE CONTROL TO REDUCE IMPACTS DUE TO TRANSMISSION GEAR LASH WHILE MAINTAINING HIGH RESPONSIVENESS TO THE DRIVER

(75) Inventors: Jeffrey A. Doering, Canton, MI (US); Michael J. Cullen, Northville, MI (US); Rob Ciarrocchi, Stockbridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 10/659,608

(22) Filed: Sep. 9, 2003

(65) Prior Publication Data

US 2005/0054482 A1 Mar. 10, 2005

(51) Int. Cl.[7] ........................................ B60K 41/04
(52) U.S. Cl. ........................................ 477/110
(58) Field of Search ........................................ 477/107, 110, 477/111; 701/54

(56) References Cited

U.S. PATENT DOCUMENTS 5,161,433 A * 11/1992 Sakakibara et al. ........... 477/43
5,478,293 A 12/1995 Yonezawa
5,795,266 A * 8/1998 Hasegawa et al. .......... 477/169
5,846,161 A * 12/1998 Hosseini et al. ............ 477/115
6,199,004 B1 3/2001 Russell et al.
6,266,597 B1 7/2001 Russell et al.
6,430,492 B2 8/2002 Kotwicki et al.
6,468,183 B1 10/2002 O'Neil et al.
6,506,140 B1 1/2003 O'Neil et al.
6,516,778 B1 2/2003 Light et al.
6,543,414 B2 4/2003 O'Neil et al.
6,560,523 B2 5/2003 Kotwicki et al.
6,600,988 B1 7/2003 Da et al.

FOREIGN PATENT DOCUMENTS

JP 09-32915 * 2/1997 ........... F16H/61/14

* cited by examiner

*Primary Examiner*—Ha Ho
(74) *Attorney, Agent, or Firm*—Allan J. Lippa; Alleman Hall McCoy Russell & Tuttle LLP

(57) ABSTRACT

An engine control system controls engine torque to transition through the transmission and driveline's lash zone. The transmission and driveline's lash zone is indicated using information of the speed ratio across the torque converter. This information is then supplemented with information of the driver's request and vehicle speed so that engine torque is adjusted at various predetermined rates based on current operating conditions. As such, the system can reduce undesired drive feel that otherwise may occur as the system passes through the transmission and driveline's lash zone. By limiting the change of torque in this way, driveability, while at the same time maintaining acceptable performance response.

17 Claims, 5 Drawing Sheets

Fig. 7

Example Embodiment of Computer Code

| **Terms** | **Units** | **Definition** |
|---|---|---|
| app | flag | -1=foot off accel pedal, 0=part pedal, 1=max pedal |
| bcsdc | fraction | torque converter bypass clutch duty cycle |
| TQE_RATE_MNDC | unitless | threshold of duty cycle to enable filter |
| FNTQ_RATEMUL | unitless | modifier to engine torque rise rate limit |
| FNTQ_RATEMAX | Nm/sec | engine torque rise rate limit |
| pps_rel_hyst | a/d cnts | accelerator pedal position (relative value of PP to foot off position) |
| vspd | mph | vehicle speed |
| novs | rpm/mph | ratio of engine speed / vehicle speed |
| spd_ratio | unitless | ratio of turbine speed / engine speed |
| tq_dd_unfil | Nm | filter input |
| tqe_dd_filt_tmp | Nm | filter output |
| tqe_dd_req | Nm | engine torque request (input) (based on pps_rel_hyst and vehicle speed in one example) |
| tqe_dd_filt | Nm | last pass filtered output |

```
if (( app > -1 )                    /* At part pedal tipin */
     && ( bcsdc < tqe_rate_mndc )/* converter is not lock yet */
     && (tq_dd_unfil > tqe_dd_filt) ) /* increasing driver
demand request */
     {
     tqe_tipmx_tmp = lookup_3d(&fntq_ratemul, pps_rel_hyst,
vspd) * lookup_3d(&fntq_ratemax, novs, spd_ratio) ;
     tqe_arb_max = tqe_dd_filt + (tqe_tipmx_tmp * delta_sec_tmp)
; /* tipin rate */
     if (tqe_dd_filt_tmp > tqe_arb_max) /* Filtered DD greater
max */
           {
            tqe_dd_filt_tmp = tqe_arb_max ; /* Clip */
           }
            else
           {
            tqe_dd_filt_tmp = tq_dd_unfil;
           }
     else
     {
           tqe_dd_filt_tmp = tq_dd_unfil;
     }
```

ENGINE CONTROL TO REDUCE IMPACTS DUE TO TRANSMISSION GEAR LASH WHILE MAINTAINING HIGH RESPONSIVENESS TO THE DRIVER

FIELD OF THE INVENTION

The present invention relates to a system and method to control an internal combustion engine coupled to a torque converter and in particular to adjusting engine output to improve drive feel while maintaining performance.

BACKGROUND OF THE INVENTION

Internal combustion engines are controlled in many different ways to provide acceptable driving comfort during all operating conditions. Some methods use engine output, or torque, control where the actual engine torque is controlled to a desired engine torque through an output adjusting device, such as with an electronic throttle, ignition timing, or various other devices.

It is known that there is the potential for poor driveability when the vehicle operator releases and subsequently engages the accelerator pedal. Specifically, as described in U.S. Pat. No. 6,266,597, this results due to transmission or driveline gear lash. For example, when the engine transitions from exerting a positive torque to exerting a negative torque (or being driven), the gears in the transmission or driveline separate at the zero torque transition point. Then, after passing through the zero torque point, the gears again make contact to transfer torque. This series of events produces an impact, or clunk, resulting in poor driveability and customer dissatisfaction.

This disadvantage of the prior art is exacerbated when the operator returns the accelerator pedal to a depressed position, indicating a desire for increased engine torque. In this situation, the zero torque transition point must again be traversed. However, in this situation, the engine is producing a larger amount of torque than during deceleration because the driver is requesting acceleration. Thus, another, more severe, impact is generally experienced due to the transmission or driveline lash during the zero torque transition.

As such, in U.S. Pat. No. 6,266,597, the system controls engine torque to transition through the transmission or driveline lash zone. The transmission or driveline lash zone is determined using speed ratio across the torque converter. When near the transmission lash zone, engine torque is adjusted at a predetermined rate until the system passes through the transmission lash zone. By limiting the change of torque in this way, driveability is improved and it is possible to quickly and reliably provide negative engine torque for braking.

However, the inventors herein have recognized a disadvantage with such an approach. In particular, not all situations require rate limiting, and in particular, some situations require more or less filtering than others. For example, during some conditions the driver does not feel the transmission clunk as well as during other conditions. Likewise, the driver may rather tolerate some mild transmission or driveline clunk to obtain improved engine response in some situations.

SUMMARY OF THE INVENTION

The above disadvantages are overcome by a vehicle control method for a vehicle having an internal combustion engine coupled to a torque converter, the torque converter having a speed ratio from torque converter output speed to torque converter input speed, the torque converter coupled to a transmission. The method comprises:

selecting a rate of change limit based at least on both a driver request and a speed ratio across said torque converter input and output speeds; and adjusting an operating parameter to control a change in an engine output to be less than said rate of change limit during preselected operating conditions.

An advantage of the present invention is that it is possible to improve drive feel, while at the same time still providing responsive engine output to driver requests. As such, improved refinement and response are simultaneously achieved, even when the driver is applying the accelerator pedal under various vehicle operating conditions.

The reader of this specification will readily appreciate other features and advantages of the present invention.

BRIEF DESCRIPTION OF THE DRAWINGS

The object and advantages described herein will be more fully understood by reading an example of an embodiment in which the invention is used to advantage, referred to herein as the Description of an Embodiment, with reference to the drawings wherein:

FIG. 7 is an example listing of computer code.

DESCRIPTION OF AN EMBODIMENT

Figure 1:
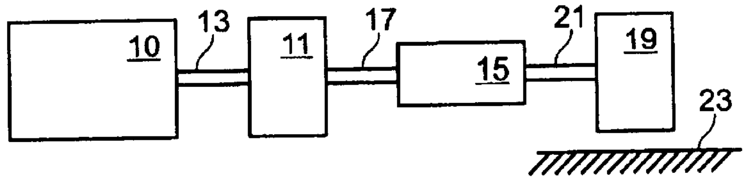
FIG. 1 is a block diagram of a vehicle illustrating various components related to the present invention.
Figure 2:
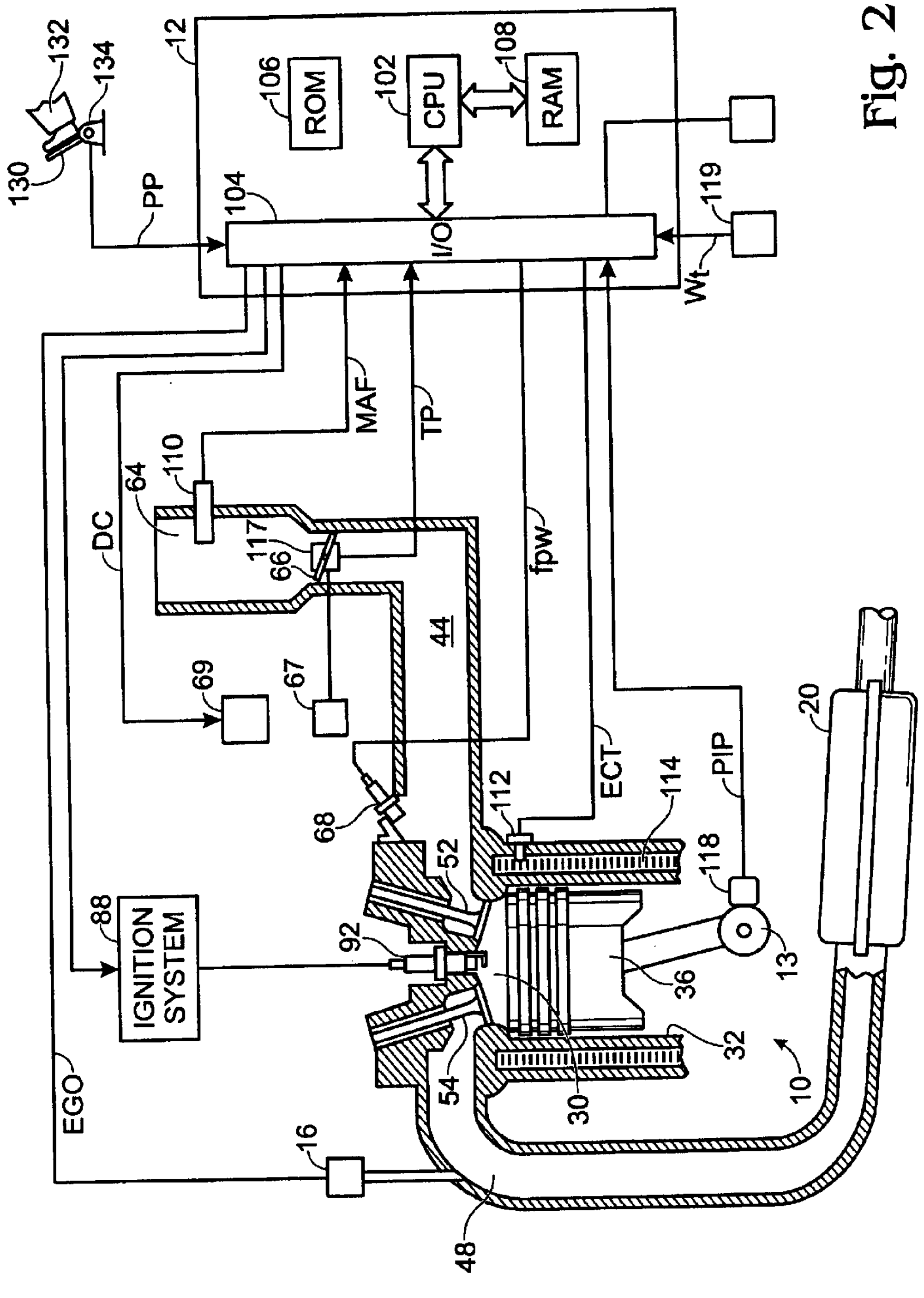
FIG. 2 is a block diagram of an engine in which the invention is used to advantage.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or partially engaged, the torque converter is said to be in an unlocked state. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

Internal combustion engine 10 comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

As described above, the present invention is directed, in one example, to solving disadvantages that occur when the driver "tips-in" (applies the accelerator pedal) after the torque in the driveline has transitioned into the negative region. In such cases, the driveline elements will have to transition through their lash region to provide positive torque to the wheels, where the transition through the lash region can produce an objectionable "clunk" if the impact velocity of the driveline elements is too fast.

In an automatic transmission vehicle, to have positive torque produced by the torque converter and transmitted to the driveline, the engine speed must be above turbine speed and the turbine speed must be at the synchronous turbine speed. (The torque converter speed ratio (turbine speed/engine speed) is less than 1.0 when positive torque is being delivered). If the transition from speed ratios >1 to <1 is not properly managed, then the engine can accelerate too fast through this region (beginning to produce positive torque) resulting in a higher rise rate of output shaft torque accelerating the elements in the driveline. Higher torque levels before the lash in the driveline being taken up can then produce higher impact velocities and make "clunk" more likely. While an engine torque estimation model in the controller can be used, errors in the estimation can reduce estimate accuracy so that it may not reliably indicate whether the driveline torque is slightly positive or slightly negative. As such, the present invention proposes another method, that can be used alone or in addition to a torque estimate, to accurately indicate when the vehicle is transitioning through the lash region, even in the presence of external noise factors.

Figure 3A:
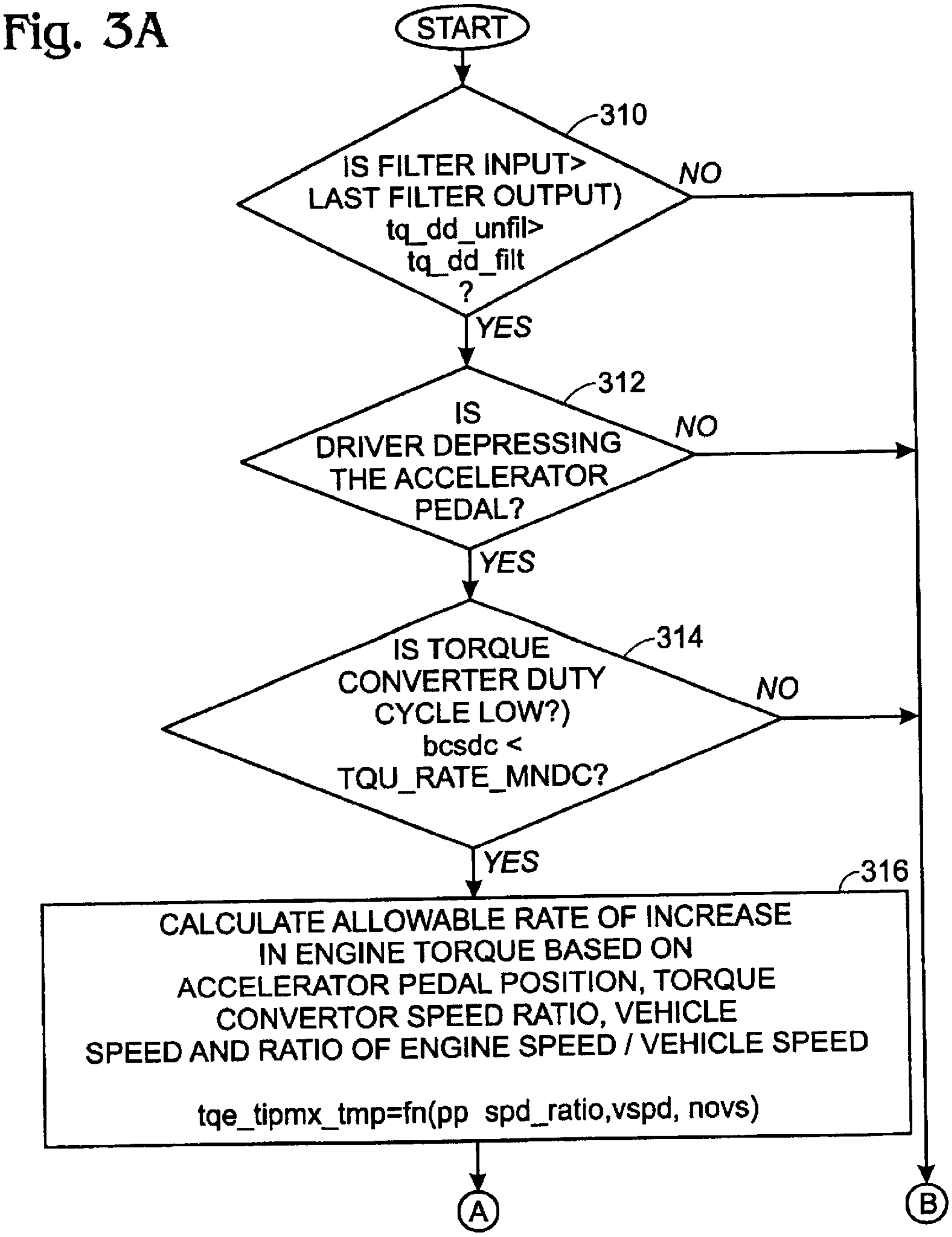
FIGS. 3A–3B are a high level flowchart of a routine for controlling the engine according to the present invention.
Figure 3B:
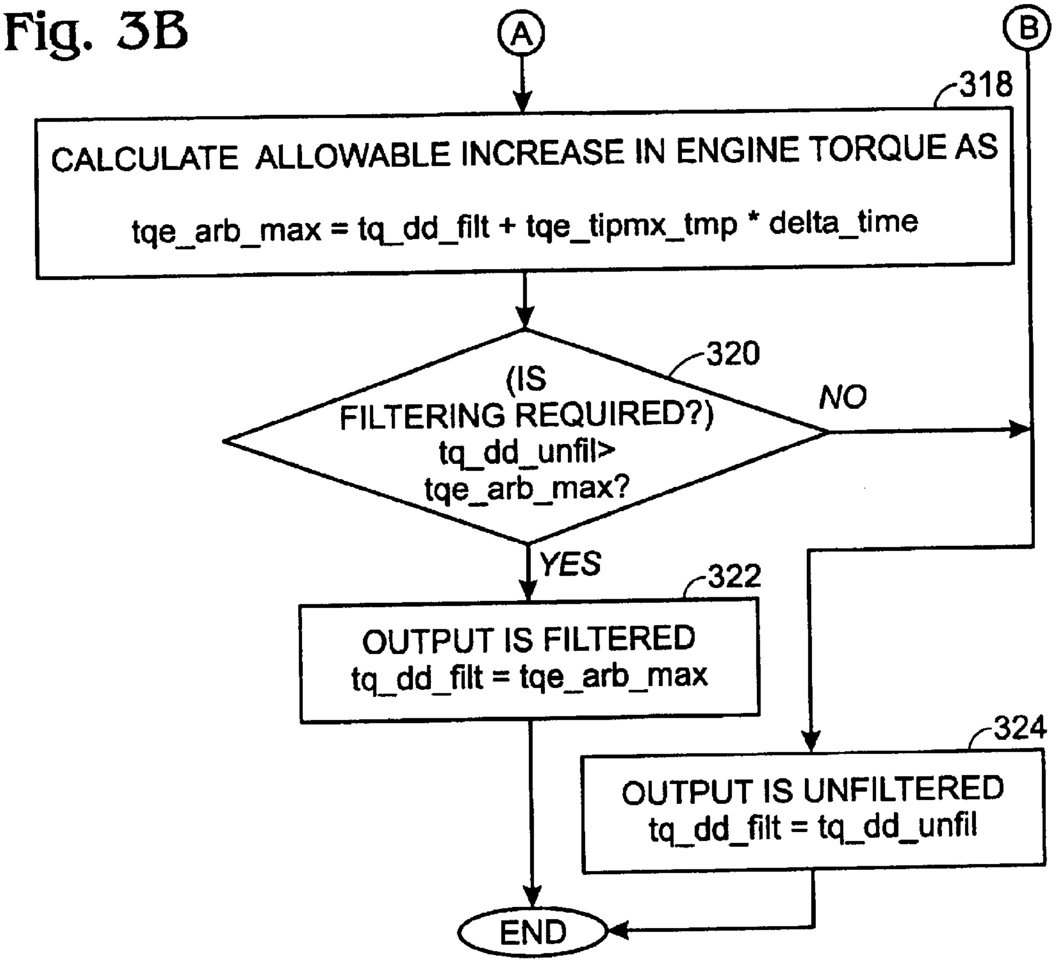

One control approach is described with regard to FIGS. 3A–3B. Specifically, this controller uses the torque converter speed ratio to infer the torque level in the driveline. If the speed ratio is >1, the transmission is deemed to not be producing positive torque. As described above, a fast rise in engine torque occurring before the speed ratio is >1 by some margin can result in the risk of clunk. However, as recognized by the present inventors, the level to which engine torque can be managed or reduced relative to requested output is dependent on the performance expected by the driver, as indicated by accelerator pedal position, in one example. Further, since the level of torque multiplication in the transmission and vehicle speed also affect the level of acceleration in the driveline and how perceptible a clunk might be to the customer, these factors can also be considered. Therefore, in one example, four inputs are used to determine a maximum rise rate for engine torque, including: speed ratio, pedal position, vehicle speed and the ratio of engine speed to vehicle speed (novs). This rate is then used to calculate a filtered version of the driver's requested engine torque to avoid tip-in clunk, as described above. Note, however, that not all of these parameters are required, and various combinations, and sub-combinations, can be used.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 24.

Referring now to FIGS. 3A–3B, a routine is described for limiting the rate of increase in engine output to reduce engine clunk. First in step 310, the routine determines whether the current filter output is greater than the last filter output (tq_dd_unfil>tq_dd_filt). When the answer to step 310 is YES, the routine continues to step 312. In step 312, the routine determines whether the driver is depressing the accelerator pedal 130 as measured by signal PP via sensor 134. In one example, the routine determines whether the driver is depressing the accelerator pedal by determining whether the pedal position is less than the preselected value. Note that this preselected value can be an adaptive parameter that tracks variations in the closed pedal position due to sensor aging, mechanical wear, and various other factors. When the answer to step 312 is YES, the routine continues to step 314.

In step 314, the routine determines whether the torque converter clutch duty cycle is low. In one example, the routine determines whether the commanded duty cycle (bcsdc) is less than a calibratable threshold value (TQE_RATE_MNDC). Specifically, in step 314, the routine can then determine whether the torque converter is in a locked or unlocked state. When the answer to step 314 is YES, indicating that the torque converter is not locked, the routine continues to step 316.

Figure 4:
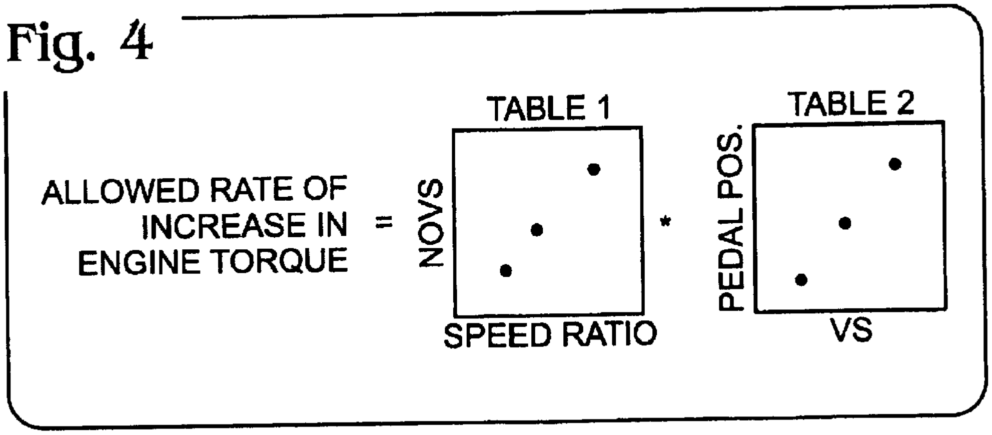
FIG. 4 is a block diagram of one calculation utilized in the routine of FIGS. 3A–3B.

In step 316, the routine calculates an allowable rate of increase in engine torque based on various factors. Specifically, the routine uses information that relates status and conditions of the engine and vehicle indicative of whether clunk can affect drive feel, and whether rate limiting requested engine torque will reduce vehicle response. In particular, in one example, the routine utilizes the sensed accelerator pedal position (PP), the torque converter speed ratio, the vehicle speed, and the ratio of vehicle speed to engine speed. In one example, the allowable rate of increase (tqe_tipmx_tmp) is determined as a four dimensional function of the pedal position, speed ratio, vehicle speed, and engine speed to vehicle speed ratio. In another example, the calculation as illustrated in FIG. 4 can be utilized with two dimensional look up tables. The first look up table can use the ratio of engine speed to vehicle speed, and torque converter speed ratio as inputs, while the second table can use pedal position and vehicle speed as inputs, with the results of the two look up tables being multiplied together to provide the allowable rate of increase in engine torque.

Continuing with FIGS. 3A–3B, in step 318, the routine calculates the allowable increase in engine torque (tqe_arb_max) as the sum of the filtered torque input value (tq_dd_filt) and the product of the maximum allowable rate of increase times the sample time (delta_time). Next, in step 320, the routine determines whether filtering is required by checking whether the unfiltered requested torque is greater than the allowable increased engine torque calculated in step 315.

When the answer to step 320 is YES, the output is filtered by setting the filtered output torque used to control engine operation as equal to the maximum allowable torque calculated in step 318. Alternatively, when the answer to step 320 is NO, the routine continues to step 324 and uses the unfiltered output as the torque used to control engine operation. Note that the output of the routine of FIGS. 3A–3B (tq_dd_filt), which represents the rate limited requested torque to be produced, is then used to carry out various engine operations. Specifically, this last value is utilized to schedule control actions such as, for example: controlling the throttle position of an electronically controlled throttle, controlling fuel injection of the fuel injectors, controlling ignition timing of the engine, and various other parameters. In this way, the engine system can be controlled to provide the requested filter torque, thereby reducing engine clunk while still providing acceptable and responsive vehicle operation.

Referring now to FIG. 4, a block diagram indicates one method for calculating the allowed rate of increase in engine torque as a function of the output of two look up tables (table 1 and table 2). The first look up table utilizes two inputs: the first being the ratio of engine speed to vehicle speed, and the second being the speed ratio of the torque converter. The second table utilizes both the pedal position, and vehicle speed, as inputs. The tables are populated with parameters via experimental testing and computer modeling as is known in the art. This illustrates one example for utilizing these inputs to calculate the rate of increase in engine torque, various others can be used, such as, for example: a single function of all four parameters, or various other equations in which these parameters, or a subcombination of these parameters, are used.

Figure 5:
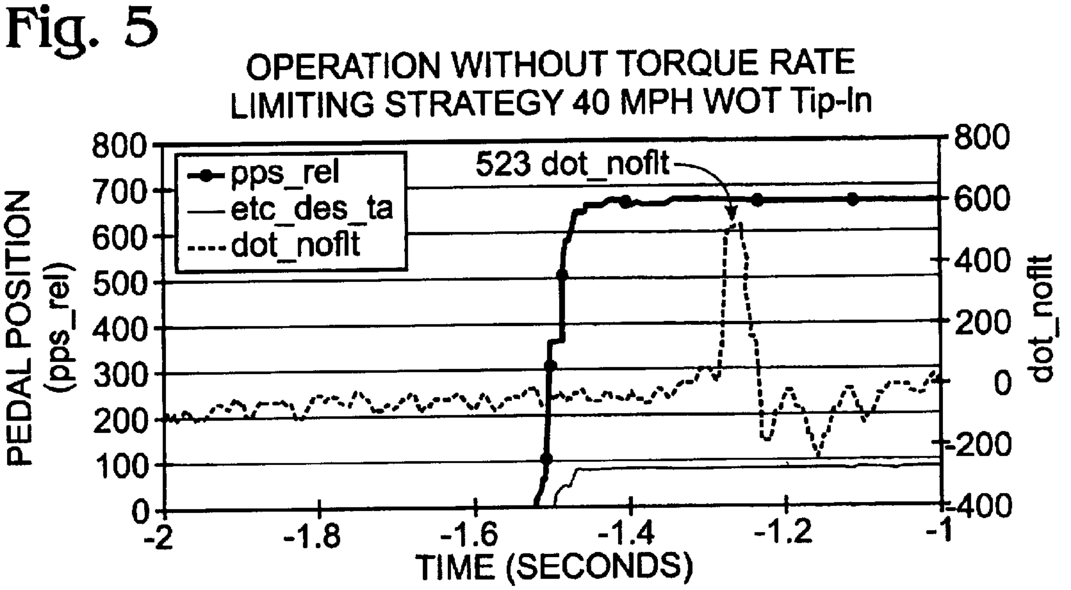
FIGS. 5–6 are graphs illustrating a comparison of operation with and without operation according to an embodiment of the present invention.
Figure 6:
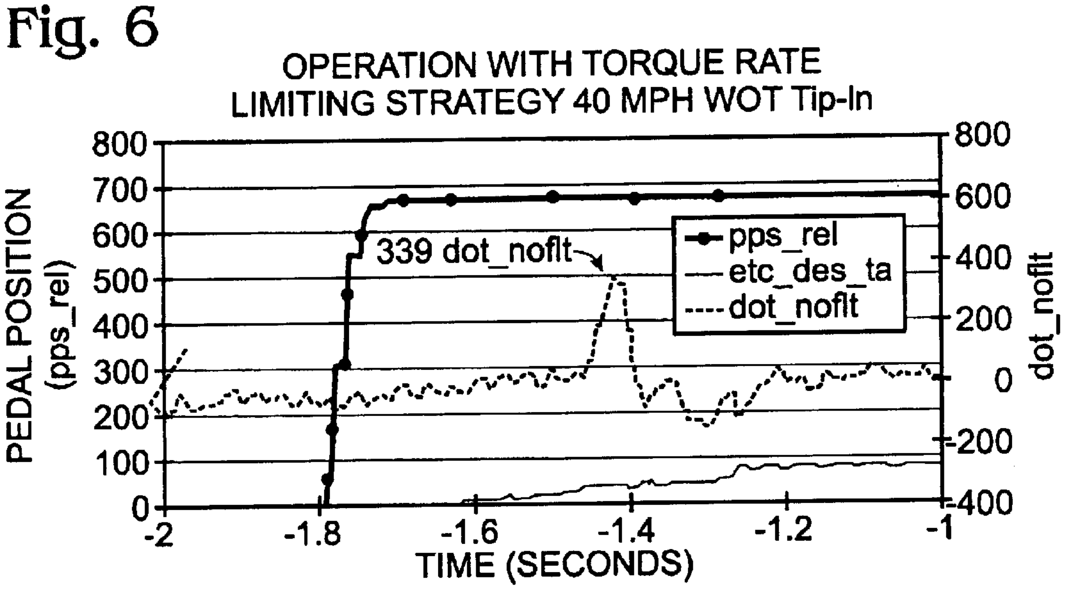

Referring now to FIGS. 5 and 6, operation with and without the torque rate limiting strategy is illustrated using actual experimental data from an operating vehicle. The graphs show the relative pedal position (pps_rel) on the left-hand vertical axis, marked with a dotted solid line. In addition, the desired electronic throttle angle (etc_des_ta) is illustrated with a dashed line. Finally, the acceleration of the vehicle's driveshaft is illustrated with a solid line (dot_noflt). The acceleration of the driveshaft while the elements in the driveline are transitioning through the lash zone is directly related to the velocity of impact in the critical element in the driveline that generates the 'clunk'.

FIG. 5 shows results with operation not utilizing the torque rate limiting strategy, and as shown, a large spike in the parameter dot_noflt indicates that significant driveline disturbance or clunk has occurred. On the other hand, FIG. 6 illustrates results utilizing the appropriate limiting strategy, and shows, under similar conditions, a much smaller spike in the parameter dot_noflt. This indicates that the driveline disturbance, and therefore, the potential for perceptible clunk has been significantly reduced according to operation of the present invention.

This concludes the description of the Preferred Embodiment. The reading of it by those skilled in the art would bring to mind many other alterations and modifications without departing from the spirit and scope of the invention. For example, if turbine speed is not measured, vehicle speed and gear ratio can be substituted without loss of function. Accordingly, it is intended that the scope of the invention be limited by the following claims.

We claim:

1. A vehicle control method for a vehicle having an internal combustion engine coupled to a torque converter, the torque converter having a speed ratio from torque converter output speed to torque converter input speed, the torque converter coupled to a transmission, the method comprising:

selecting a rate of change limit based at least on both a driver request and a speed ratio across said torque converter input and output speeds; and adjusting an operating parameter to control a change in an engine output to be less than said rate of change limit during preselected operating conditions.

2. The method recited in claim 1 wherein said selected rate of change is further based on a ratio of engine speed to vehicle speed.

3. The method recited in claim 1 wherein said selected rate of change is further based on vehicle speed.

4. The method recited in claim 1 wherein said selected rate of change is further based on vehicle speed and a ratio of engine speed to vehicle speed.

5. The method recited in claim 1 wherein said selected rate of change is based on a first function of said speed ratio and a ratio of engine speed to vehicle speed, and a second function of said driver request and vehicle speed.

6. The method recited in claim 1 wherein said driver request is a measured pedal position.

7. The method recited in claim 1 wherein said adjusting is enabled based on an amount of actuation of an electronically controlled clutch coupled to said torque converter.

8. The method recited in claim 1 wherein said adjusting is enabled based on whether a driver is actuating an accelerator pedal.

9. The method recited in claim 1 wherein said vehicle is a passenger vehicle traveling on a road.

10. A vehicle control method for a vehicle having an internal combustion engine coupled to a torque converter, the torque converter having a speed ratio from torque converter output speed to torque converter input speed, the torque converter coupled to a transmission, the method comprising:

selecting a rate of change limit based at least on a driver request, a speed ratio across said torque converter input and output speeds, and vehicle speed; and adjusting an operating parameter to control a change in an engine output to be less than said rate of change limit during preselected operating conditions.

11. The method recited in claim 10 wherein said selected rate of change is further based on a ratio of engine speed to vehicle speed.

12. The method recited in claim 10 wherein said selected rate of change is based on a first function of said speed ratio and a ratio of engine speed to vehicle speed, and a second function of said driver request and vehicle speed.

13. The method recited in claim 10 wherein said driver request is a measured pedal position.

14. The method recited in claim 10 wherein said driver request is a requested output torque.

15. The method recited in claim 10 wherein said adjusting is enabled based on an amount of actuation of an electronically controlled clutch coupled to said torque converter.

16. The method recited in claim 10 wherein said adjusting is enabled based on whether a driver is actuating an accelerator pedal.

17. The method recited in claim 10 wherein said vehicle is a passenger vehicle traveling on a road.

* * * * *